(12) United States Patent
Kobayashi et al.

(10) Patent No.: US 10,517,165 B2
(45) Date of Patent: Dec. 24, 2019

(54) PLASMA CUTTING APPARATUS

(71) Applicant: Koike Sanso Kogyo Co., Ltd., Tokyo (JP)

(72) Inventors: Ryuji Kobayashi, Tokyo (JP); Masahiro Mogi, Tokyo (JP); Akira Hurujo, Tokyo (JP)

(73) Assignee: Koike Sanso Kogyo Co., Ltd., Tokyo (JP)

( * ) Notice: Subject to any disclaimer, the term of this patent is extended or adjusted under 35 U.S.C. 154(b) by 84 days.

(21) Appl. No.: 15/192,511

(22) Filed: Jun. 24, 2016

(65) Prior Publication Data

US 2016/0381778 A1    Dec. 29, 2016

Related U.S. Application Data

(63) Continuation of application No. PCT/JP2014/083193, filed on Dec. 16, 2014.

(30) Foreign Application Priority Data

Dec. 25, 2013   (JP) .................................. 2013-266292

(51) Int. Cl.
  *H05H 1/34*    (2006.01)
  *B23K 10/00*   (2006.01)
  (Continued)

(52) U.S. Cl.
  CPC ........... *H05H 1/3405* (2013.01); *B23K 10/00* (2013.01); *B23K 10/006* (2013.01); *H05H 1/36* (2013.01);
  (Continued)

(58) Field of Classification Search
  CPC .......... B23K 10/006; H05H 1/34; H05H 1/36; H05H 2001/3494
  (Continued)

(56) References Cited

U.S. PATENT DOCUMENTS 3,949,188 A * 4/1976 Tateno .................. B23K 9/013
                                                                  219/121.36
4,916,283 A * 4/1990 Nagasaka ................ H05H 1/28
                                                                  219/121.49
(Continued)

FOREIGN PATENT DOCUMENTS

EP         1284169 A2    2/2003
JP         S61-92782 A   5/1986
           (Continued)

OTHER PUBLICATIONS

International Search Report (ISR) dated Mar. 31, 2015 in parent application PCT/JP2014/083193 (3 pages).
(Continued)

*Primary Examiner* — Tu B Hoang
*Assistant Examiner* — Vy T Nguyen
(74) *Attorney, Agent, or Firm* — Shlesinger, Arkwright & Garvey LLP

(57) ABSTRACT

The present invention is a plasma cutting apparatus (A) configured such that a starting gas is switched to plasma gas at the stage when current is applied to an electrode provided to a plasma torch, and a plasma arc is produced at a preset current value on a material (B) to be cut, so as to extend the life of the electrode, wherein the apparatus is configured to have: a starting gas supply unit (2) having a starting gas solenoid valve (2b) provided with a starting gas supply source (2a) and a starting gas pipeline (2c); a plasma gas supply unit (3) having a plasma gas solenoid valve (3b) provided with a plasma gas supply source (3a) and a plasma gas pipeline (3c); a plasma gas connection part (8) for connecting the downstream-side end part of the starting gas supply unit and the downstream-side end part of the plasma gas supply unit; a gas pipeline part (5) for connecting the plasma gas connection part (8) and a torch body (1a); a flow retention member (4) provided to the gas pipeline part; and (Continued)

a control device (10) for controlling the opening and closing of the solenoid valves, and controlling the flow retention member.

2 Claims, 3 Drawing Sheets

(51) Int. Cl.
*H05H 1/36* (2006.01)
*B23K 101/18* (2006.01)
*B23K 103/04* (2006.01)

(52) U.S. Cl.
CPC ...... *B23K 2101/18* (2018.08); *B23K 2103/04* (2018.08)

(58) Field of Classification Search
USPC ............ 219/121.55, 121.51, 121.54, 121.59,
219/121.39, 121.44, 121.11, 121.36,
219/121.48, 121.5, 121.57; 366/101, 103,
366/107, 336, 337, 341; 702/50, 81, 98
See application file for complete search history.

(56) References Cited

U.S. PATENT DOCUMENTS

| | | | | |
|---|---|---|---|---|
| 5,170,033 A * | 12/1992 | Couch, Jr. | ............ | B23K 10/006 219/121.48 |
| 5,290,995 A | 3/1994 | Higgins et al. | | |
| 5,396,043 A | 3/1995 | Couch, Jr. et al. | | |
| 6,232,575 B1 * | 5/2001 | Oakley | ............ | H05H 1/36 219/121.44 |
| 6,248,972 B1 * | 6/2001 | Yamaguchi | ............ | B23K 10/00 219/121.39 |
| 6,326,583 B1 * | 12/2001 | Hardwick | ............ | H05H 1/36 219/121.39 |
| 7,115,833 B2 * | 10/2006 | Higgins | ............ | B23K 9/16 219/121.5 |
| 9,024,230 B2 * | 5/2015 | Barnett | ............ | B23K 9/0678 219/121.36 |
| 9,642,237 B2 * | 5/2017 | Peters | ............ | B23K 10/006 |
| 2003/0034334 A1 * | 2/2003 | Furujo | ............ | B23K 26/0096 219/121.55 |
| 2005/0035093 A1 * | 2/2005 | Yamaguchi | ............ | B23K 10/00 219/121.39 |
| 2006/0186094 A1 * | 8/2006 | Krink | ............ | B23K 10/006 219/121.55 |
| 2008/0302767 A1 * | 12/2008 | Yamaguchi | ............ | B23K 10/00 219/121.44 |
| 2010/0176096 A1 * | 7/2010 | Koike | ............ | B23K 10/00 219/121.44 |
| 2011/0155702 A1 * | 6/2011 | Winn | ............ | B23K 10/006 219/121.51 |

FOREIGN PATENT DOCUMENTS

| | | |
|---|---|---|
| JP | 64-9112 | 2/1989 |
| JP | 2000-312974 A | 11/2000 |
| JP | 2003-53548 A | 2/2003 |
| JP | 2013-202663 A | 10/2013 |
| WO | WO 92/18282 A | 10/1882 |

OTHER PUBLICATIONS

International Preliminary Report on Patentability dated Jun. 28, 2016 in parent application PCT/JP2014/083193 (5 pages).
Written Opinion dated Mar. 31, 2015 in parent application PCT/JP2014/083193 (6 pages).

* cited by examiner

PLASMA CUTTING APPARATUS

CROSS-REFERENCE TO RELATED APPLICATIONS

This application is a continuation of Application No. PCT/JP2014/083193, filed 16 Dec. 2014, which claims the priority of Japanese Patent Application No. 2013-266292, filed 25 Dec. 2013, and each of which is incorporated herein by reference.

TECHNICAL FIELD

The present invention relates to a plasma cutting apparatus which can extend service life of an electrode provided on a plasma cutting torch.

BACKGROUND ART

The plasma cutting method has been popular in which plasma arc is ejected toward a material to be cut in order to cut it. The plasma cutting apparatus which is used when the plasma cutting method is performed has a conductive electrode which is detachably attachable to a conductive electrode base provided on a torch main body of the plasma cutting torch, a conductive nozzle which is detachably attachable to the torch main body, the nozzle surrounding the electrode and being disposed on the electrode in an insulated state, and the gas supplying source which supplies plasma gas for forming plasma arc in the circumference of the electrode.

When a material to be cut is cut by the plasma cutting torch, a pilot arc is firstly formed by producing an electric discharge between the electrode and the nozzle while providing plasma gas between them. A pilot arc is ejected toward the material to be cut from the nozzle and an electric discharge occurs between the electrode and the material to be cut, thereby forming a plasma arc. By melting the base material with the plasma arc and by eliminating molten material while moving the plasma cutting torch, the material to be cut can be cut.

In the plasma cutting torch in which plasma gas including oxygen is ejected in a plasma state toward the material to be cut to cut it, an electrode is commonly used in which an electrode member formed of hafnium, zirconium, or alloy thereof is buried and fixed in the center of a holder formed of copper or copper alloy. An electrode member of such an electrode is worn as it is melted by the heat of the plasma arc and oxidized by the plasma gas. Thus, an extension of service life of the electrode of the plasma cutting torch is desired and many proposals are made for it.

The patent document 1 discloses the plasma cutting starting method which is accomplished based on the knowledge that an endurance time becomes shorter as the number of start operations becomes large. In this technology, when starting the plasma cutting, a gas in which oxygen gas with 70 to 10 mole percent and nitrogen gas with 30 to 90 mole percent are mixed is used and after the completion of the start, the gas is switched to oxygen gas (plasma gas) with the concentration of 95 percent or more to perform the cutting.

The patent document 1 discloses the gas supply piping system (FIG. 2) and the following explanation. When starting the plasma cutting, the mixed gas electromagnetic valve 9 is opened and the oxygen electromagnetic valve 8 is closed. After the completion of the start of cutting, the mixed gas electromagnetic valve 9 is closed and the oxygen electromagnetic valve 8 is opened thereby switching plasma gas to oxygen. The switching is performed by a setting timer according to previously prepared widths of the plates because the piercing time depends on the width of the plate to be cut.

The patent document 2 relates to a method and an apparatus for cutting and welding with plasma arc. The patent document 2 discloses that the nitrogen or oxygen is supplied to the oxygen plasma supply line (76) by the nitrogen/oxygen solenoid selector valve SV15, that the solenoid selector valves SV1 to SV3 are connected to the supply line in parallel and that the needle valves MV1 to MV3 for adjusting a flow rate are respectively connected to the solenoid selector valves SV1 to SV3 in series.

When a start command of the operations is issued, a pilot arc is started by opening SV2 and SV3 at the same time and by supplying a gas selected by SV15 and whose flowing amount is previously set by the needle valves MV2 and MV3 to the circumference of the electrode. Thereafter, SV3 is closed when a predetermined time elapses, and SV1 and SV3 are opened in addition to SV2 when a predetermined time further elapses, and then SV2 is closed, and SV3 is closed when the pilot arc is switched to the plasma arc thereby continuing the plasma arc by the gas supplied from SV1.

PRIOR ART DOCUMENTS

Patent Documents

Patent Document 1: Japanese Patent No. 1525321 (Patent publication S64-9112)
Patent Document 2: Japanese Patent No. 3172532

SUMMARY OF THE INVENTION

Problems to be Solved by the Invention

Extending service life of an electrode of a plasma torch is always desired and the invention disclosed in the Patent Document 1 is going to realize this by using gas having low purity oxygen when starting a plasma arc.

There exist pipes and hoses from the electrode provided on the plasma cutting torch to the electromagnetic valve for supplying start gas and plasma gas and it is common that the inner volumes of the pipes and the hoses are large. In the invention disclosed in the Patent Document 1, the distance between the electrode and mixed gas electromagnetic vale or oxygen electromagnetic valve is large and the time delay occurs from the time when these electromagnetic valves are opened and to the time when the target gas is supplied in the circumference of the electrode. Thus, when the operation is performed in which the mixed gas electromagnetic valve is closed and the oxygen electromagnetic valve is opened, the flow rate of the gas which is supplied in the circumference of the electrode changes, thereby promoting wear of the electrode.

In the invention disclosed in the Patent Document 2, the rapid filling valve SV3 is provided. When the SV1 or SV2 is opened, SV3 is simultaneously opened for a predetermined time period to increase the flow rate of the gas to be supplied. However, the flow rates of SV1 to SV3 are adjusted by MV1 to MV3 respectively so that it does not resolve the problem that a change in flow rate of gas in the circumference of the electrode occurs when the SV1 to SV3 are opened and closed.

Gas used when a pilot arc or a plasma arc is formed is oxygen or nitrogen which is selected by the SV15. Thus, there is also a problem that it is effectively difficult to change from nitrogen to oxygen when a pilot arc is switched to a plasma arc.

In gas fluid including start gas or plasma gas, a significant change in flow rate occurs the moment the electromagnetic valve is opened or closed as indicated by the dotted line of flow rate of an prior art example in FIG. 3. Thus, a flow rate of the gas supplied in the circumference of the electrode changes, thereby promoting wear of the electrode.

The object of the present invention is to provide a plasma cutting apparatus which can extend service life of an electrode provided on the plasma cutting torch.

Means for Solving the Problem

In order to solve the above problem, configured as the present invention is a plasma cutting apparatus in which start gas is supplied in a circumference of an electrode provided on a plasma cutting torch before applying a plasma current to the electrode, and in which the start gas is switched to plasma gas in the process where a plasma arc is produced at a previously set current value after the plasma current is applied to the electrode, the plasma cutting apparatus comprising:

a start gas supplying portion which supplies the start gas to the electrode, the start gas supplying portion having a start gas supplying source and a start gas electromagnetic valve provided on start gas piping;

a plasma gas supplying portion which supplies the plasma gas to the electrode, the plasma gas supplying portion having a plasma gas supplying source and a plasma gas electromagnetic valve provided on plasma gas piping;

a plasma gas connection portion which connects a downstream-side end of the start gas supplying portion and a downstream-side end of the plasma gas supplying portion;

a gas piping portion which supplies the start gas, the plasma gas or gas in which the start gas and the plasma gas are mixed to the electrode, the gas piping portion having a flow rate maintaining member, one end of the gas piping portion being connected to the plasma gas connection portion and the other end of the gas piping portion being connected to the plasma cutting torch; and a controlling device which controls the flow rate maintaining member as well as opening and closing of the start gas electromagnetic valve and the plasma gas electromagnetic valve.

EFFECT OF THE INVENTION

In the above plasma cutting apparatus, the downstream-side end of the start gas supplying portion which supplies the start gas and the downstream-side end of the plasma gas supplying portion which supplies the plasma gas are connected by the plasma gas connection portion. Further, the plasma gas connection portion and the plasma cutting torch are connected by the gas piping portion and this gas piping portion is equipped with the flow rate maintaining member. Thus, when switching from the start gas to the plasma gas, the start gas, the plasma gas, or gas in which the start gas and the plasma gas are mixed can be supplied with a flow rate being maintained at a previously set flow rate.

As explained above, by switching from the start gas to the plasma gas to be supplied to the circumference of the electrode with the flow rate being maintained at a previously set value, wear of the electrode can be suppressed, thereby extending service life of the electrode. In particular, when the plasma gas is oxygen or atmosphere and the start gas is gas with an oxygen concentration lower than that of the plasma gas or gas which does not include oxygen, wear of the electrode due to oxidization of the electrode at the start can be suppressed.

The flow rate maintaining member is provided at the gas piping portion which connects the plasma connection portion connecting the start gas supplying portion and the plasma gas supplying portion, and the plasma cutting torch. Thus, in changing gas to be supplied to the circumference of the electrode from the start gas to the plasma gas, even when both the start gas and the plasma gas simultaneously flow through the gas piping portion, a flow rate of these gases is maintained by the flow rate maintaining member. Namely, when the start gas and the plasma gas enter the gas piping portion, joining at the plasma gas connection portion, the flow rate maintaining member maintains a flow rate of these gases at a previously set value, thereby supplying the gases to the electrode in a state in which a flow rate is stable. Thus, a change in pressure in the circumference of the electrode can be suppressed, thereby extending service life of the electrode.

EMBODIMENTS FOR CARRYING OUT THE INVENTION

A plasma cutting apparatus according to the present invention will be explained. The plasma cutting apparatus according to the present invention reduces oxidization when the cutting of the material to be cut is started by providing the start gas which does not include oxygen or the start gas with an oxygen concentration is lower than the plasma gas.

In particular, the downstream-side end portions of the start gas supplying portion and the plasma gas supplying portion are connected to the gas piping portion equipped with a flow rate maintaining member via the plasma gas connection portion. Thus, by opening the plasma gas electromagnetic valve before closing the start gas electromagnetic valve when the start gas is switched to the plasma gas, a change in the flow rate of the gas supplied to the circumference of the electrode can be suppressed.

Figure 1:
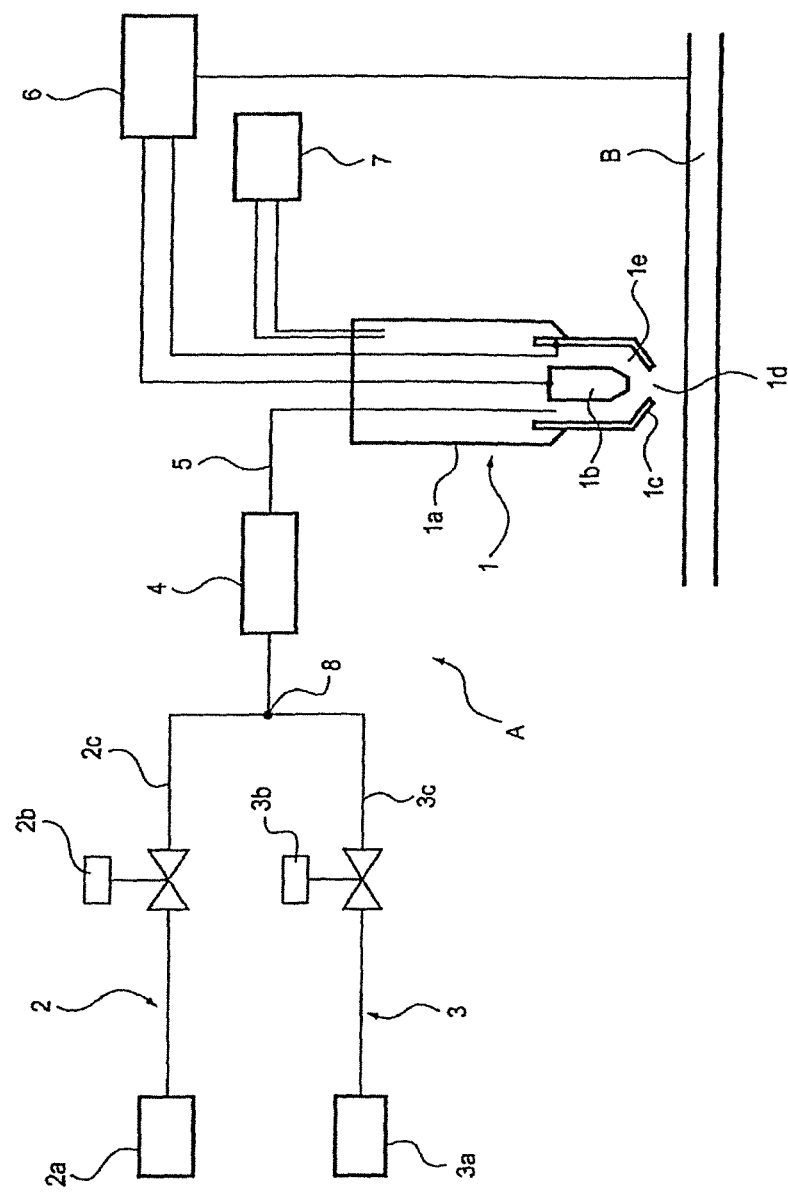
FIG. 1 a diagram for explaining the configuration of a plasma cutting apparatus according to the present embodiment FIG. 2 a diagram for explaining the control system of a plasma cutting apparatus according to the present embodiment FIG. 3 a timing chart for controlling start gas and plasma gas

As illustrated by FIG. 1, the plasma cutting apparatus A includes the plasma cutting torch 1 (hereinafter simply referred to as "torch"), the start gas supplying portion 2, the plasma gas supplying portion 3, and the gas piping portion 5 equipped with the flow rate maintaining member 4, the power supply 6 and the cooling water supplying portion 7. The downstream-side end portion of the start gas supplying portion 2 and the downstream-side end portion are connected at the plasma gas connection portion 8 which constitutes the upstream-end portion of the gas piping portion 5. By ejecting plasma arc from the torch 1 toward the material B to be cut while moving the torch 1 along a predetermined path, the material B can be cut.

The torch 1 is constituted of the torch main body 1a, the electrode 1b provided on the torch main body 1a in a detachably attachable manner, the nozzle 1c provided on the torch main body 1*a* in a detachably attachable manner. The nozzle 1*c* is formed such that the nozzle 1*c* surrounds the electrode 1*b*. The nozzle opening 1*d* is formed at the tip of the nozzle 1*c*. The gas chamber 1*e* is constituted of the electrode 1*b* and the nozzle 1*c*. The start gas, gas in which the start gas and the plasma gas are mixed, or the plasma gas are supplied to the gas chamber 1*e* where the supplied gas becomes in a plasma state to produce the pilot arc or the plasma arc.

Inside the torch main body 1*a*, a cooling water passage (not shown) is formed. The cooling water supplying portion 7 is connected to the cooling water passage to supply cooling water for cooling the electrode 1*b* and nozzle 1*c* and to discharge the supplied cooling water.

The power supply 6 is connected to the electrode 1*b*, the nozzle 1*c* and the material B to be cut. The pilot arc is formed by discharging electricity between the electrode 1*b* and the nozzle 1*c*, while supplying the start gas to the gas chamber 1*e*. Further, the plasma arch is formed by discharging electricity between the electrode 1*b* and the material B to be cut while ejecting the pilot arc from the nozzle opening 1*d*.

The start gas supplying portion 2 includes the start gas supplying source 2*a*, the start gas electromagnetic valve 2*b* and the start gas piping 2*c* which connects these portions in series. The start gas supplying source 2*a* supplies gas preferable for the start gas such as gas with a lower oxygen concentration than that of plasma gas formed of oxygen or atmosphere, and gas which does not include oxygen.

As the start gas supplying source which supplies the start gas with a lower oxygen concentration than that of plasma gas, a gas mixing device can be used which mixes oxygen and nitrogen or argon gas with a predetermined mixing ratio. As the start gas supplying source which supplies the start gas which does not include oxygen, a gas cylinder or plant piping filled with nitrogen or argon gas can be used. Thus, as the start gas supplying source 2*a*, the gas mixing device, the gas cylinder or the plant piping can be selectively used.

The start gas electromagnetic valve 2*b* is controlled by the controlling device 10 (which will be explained later) to supply the start gas to the gas chamber 1*e* formed between the electrode 1*b* and nozzle 1*c* both of which are provided on the torch 1.

The plasma gas supplying portion 3 includes the plasma gas supplying source 3*a*, the plasma gas electromagnetic valve 3*b*, and the plasma gas piping 3*c* which connects these portions in series. The plasma gas supplying source 3*a* supplies oxygen or atmosphere. For example, as a supplying source of oxygen, a cylinder or plant piping filled with oxygen can be used and as a supplying source of atmosphere, an air compressor can be used.

The plasma gas electromagnetic valve 3*b* is controlled by the controlling device 10 to supply or not to supply the plasma gas to the gas chamber 1*e* formed between the electrode 1*b* and the nozzle 1*c* both of which are provided on the torch 1.

The downstream-side end portion of the start gas piping 2*c* which constitutes the start gas supplying portion 2 and the downstream-side end portion of the plasma gas piping 3*c* which constitutes the plasma gas supplying portion 3 are connected to each other at the plasma gas connection portion 8. The gas piping portion 5 is constituted such that the upstream-side end portion of the gas piping portion 5 is the plasma gas connection portion 8.

The gas piping portion 5 is provided between the plasma gas connection portion 8 and the torch 1. The gas piping portion 5 is equipped with the flow rate maintaining member 4. The start gas supplied from the start gas supplying portion 2 and the plasma gas supplied from the plasma gas supplying portion 3 are supplied to the gas chamber 1*e* formed at the torch 1 with the flow rate set on the flow rate maintaining member 4.

The flow rate maintaining member 4 has the function of maintaining a flow rate of the gas flowing in the gas piping portion 5 at a previously set flow rate. Thus, a device which maintains the flow rate can be used as the flow rate maintaining member 4. As the flow rate maintaining member 4, a constant flow controlling device which controls the flow rate such that the flow rate returns to a predetermined flow rate when a change in a flow rate is detected or a constant flow controlling component (for example the configuration described as the constant flow component B in Japanese Patent no. 3526942) can be selectively used.

Figure 2:
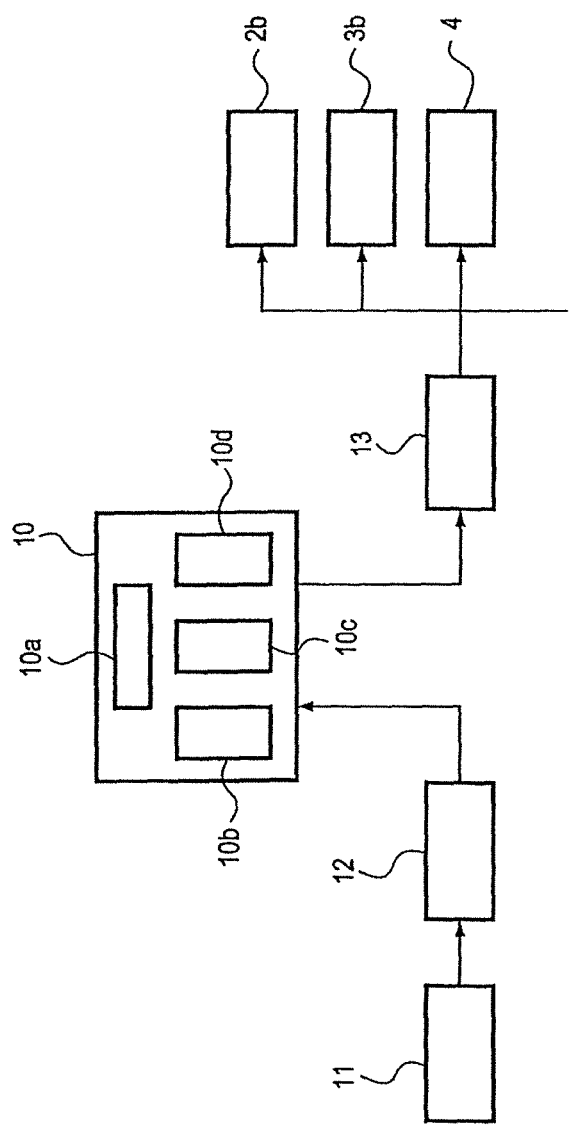

FIG. 2 is a diagram for explaining the control system for controlling the electromagnetic valves 2*b* and 3*b*, and the flow rate maintaining member 4 of the plasma cutting apparatus A. As illustrated by the figure, the controlling device 10 includes the controlling portion 10*a*, the data storage 10*b* which stores data input via the input portion 12, the timer portion 10*c* and the fluid controlling portion 10*d* which controls the operations of the flow rate maintaining member 4.

11 denotes an input device such as a keyboard by which the flow rates of the start gas and the plasma gas, the width of the material B to be cut, the shape to be cut are input via the input portion 12. 13 denotes an output portion which outputs a signal output from the controlling device 10 to the electromagnetic valves 2*b* and 3*b*, and the flow rate maintaining member 4.

The flow rate of the start gas and the flow rate of the plasma gas are input from the input device 11 in advance and they are stored in the data storage 10*b* of the controlling device 10. Synchronized with the occurrence of an open signal for the start gas electromagnetic valve 2*b*, the previously stored flow rate of the start gas is output from the fluid controlling portion 10*d* to the flow rate maintaining member 4 where the flow rate of the start gas flowing in the gas piping portion 5 is controlled to be maintained. Similarly, the flow rate of the plasma gas is stored in the data storage 10*b*. Synchronized with the occurrence of an open signal for the plasma gas electromagnetic valve 3*b*, the previously stored flow rate of the plasma gas is output to the flow rate maintaining member 4 where the flow rate of the plasma gas flowing in the gas piping portion 5 is controlled to be maintained.

In particular, when switching from the start gas to the plasma gas, the start gas and the plasma gas are supplied from the start gas piping 2*c* and the plasma gas piping 3*c* to the gas piping portion 5. Namely, until the supply of the start gas is stopped after the start gas electromagnetic valve 2*b* is closed, the gas in which the start gas and the plasma gas are mixed flows in the gas piping portion 5. When a time lag occurs between the closing timing of the start gas electromagnetic valve 2*b* and the opening timing of the plasma gas electromagnetic valve 3*b*, there is a possibility that the flow rate of the mixed gas flowing in the gas piping portion 5 after the start gas and the plasma gas join at the plasma gas connection portion 8 increases or decreases.

However, the flow rate maintaining member 4 is provided on the gas piping portion 5 which is located downstream with respect to the plasma gas connection portion 8. Thus, even when a time lag occurs in opening and closing timings of the electromagnetic valves 2*b* and 3*b*, the flow rate of the mixed gas in the gas piping portion 5 can be controlled at a previously set value with respect to the plasma gas. Namely, the flow rate maintaining member 4 controls the flow rate of the gas flowing in the gas piping portion 5 so as to maintain the flow rate of the gas flowing in the gas piping portion 5 at a previously set flow rate. Thus, when a flow rate of the gas supplied to the flow rate maintaining member 4 is deviated from the previously set value, the flow rate maintaining member 4 controls a flow rate such that the flow rate becomes the previously set value.

Thus, the gas flow rate at the downstream side of the flow rate maintaining member 4 in the gas piping portion 5 becomes constant at the previously set flow rate. However, when a flow rate at the upstream side is abruptly and largely changed, it takes time for the flow rate maintaining member 4 to respond and to operate accordingly. Thus, the gas flow rate at the downstream side changes in comparison with the previously set flow rate. In particular, a large change in flow occurs in gas fluid at the moment of closing or opening the electromagnetic valves. Thus, the flow rate of the gas at the downstream side of the flow rate maintaining member 4 changes in comparison with the previously set flow rate and is maintained at the previously set flow rate after a predetermined period of time (less than 1 sec) elapses.

The opening and closing timings of the start gas electromagnetic valve 2b and the plasma gas electromagnetic valve 3b, and the energizing timing in the above explained plasma cutting apparatus A will be explained referring to FIG. 3. In the figure, the line designated by "FLOW RATE" indicates a change in the flow rate of the gas including the start gas and the plasma gas in the gas chamber 1e. The gas in the gas chamber 1e changes from only the start gas, through the mixed gas of the start gas and the plasma gas, to only the plasma gas. In the figure, a flow rate change in the present embodiment is depicted by a solid line and the part of the prior art example different from that of present embodiment is depicted by a dotted line. Further, in the figure, the line designated by "PLASMA ARC CURRENT" indicates a change in the electric current flowing through the electrode 1b.

Figure 3:
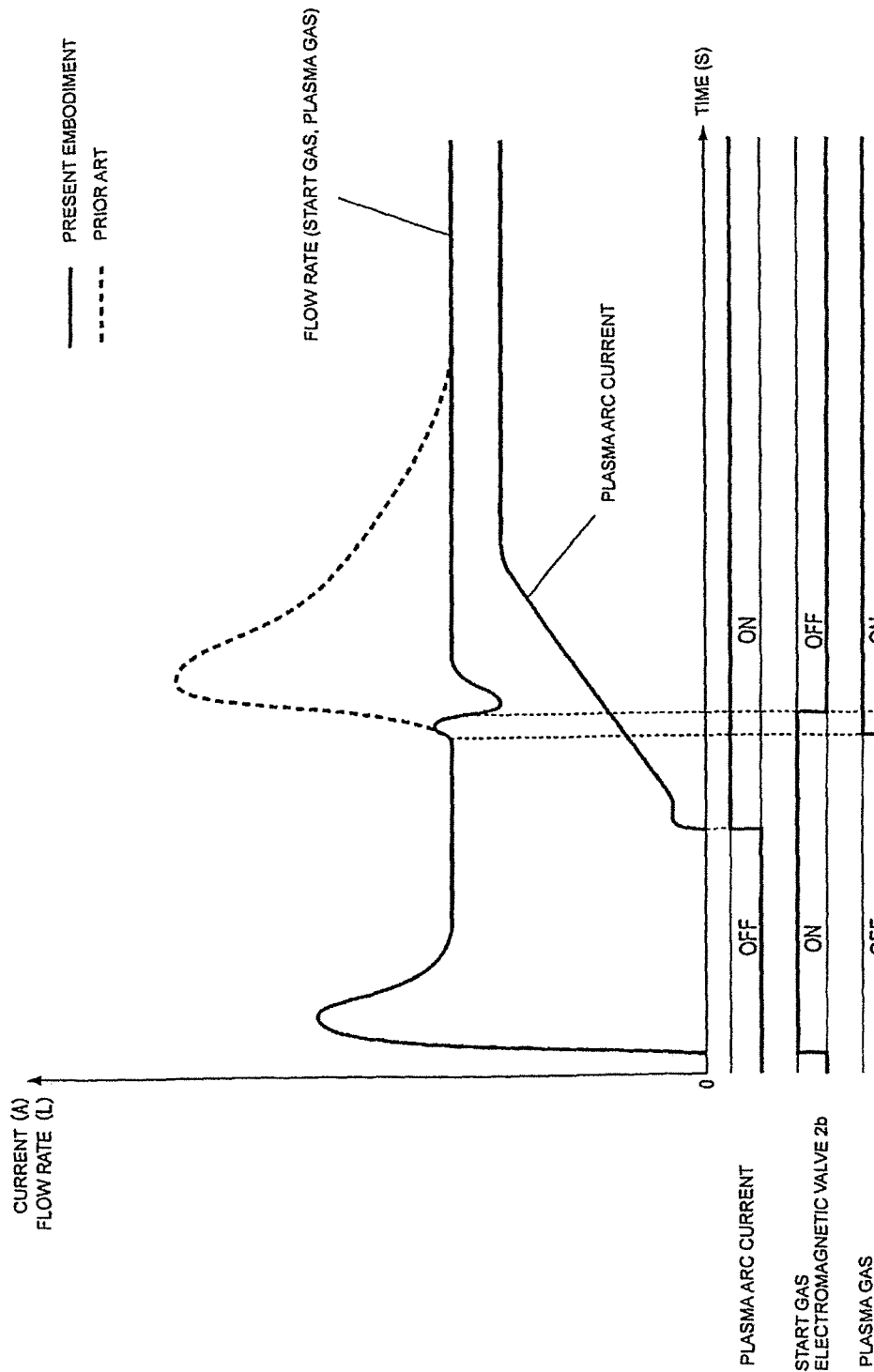

In the present embodiment, the opening and closing timings of the start gas electromagnetic valve 2b (ON, OFF of the start gas electromagnetic valve 2b in FIG. 3) and the opening and closing timings of the plasma gas electromagnetic valve 3b (ON, OFF of the plasma gas electromagnetic valve 3b in FIG. 3) are set with reference to the start of energization for the electrode 1b (ON of the plasma arc current in FIG. 3).

The start gas electromagnetic valve 2b is opened (start gas ON) a sufficient time period (for example 1 to 1.5 seconds) before the plasma arc ON which is a point in time when the energization for the electrode 1b starts. Thus, the start gas with a stable flow rate is supplied to the gas chamber 1e formed on the torch 1. The start gas electromagnetic valve 2b is closed (start gas OFF) when 0.5 second elapses from the plasma arc ON.

The solid line of "FLOW RATE" of the present embodiment in FIG. 3 dips after the start gas OFF. As depicted by the line designated by "PLASMA ARC CURRENT" in FIG. 3, a decrease in the flow rate is due to the fact that the start gas and the plasma gas become in a plasma state during the time period in which the current flowing through the electrode 1b increases to a previously set current value (for example 400 ampere) in several seconds after the energization is started by the plasma arc ON signal. Accordingly, the gas flow rate at the downstream side decreases until the flow rate maintaining member 4 responds to the change in the gas flow rate.

The change in the flow rate of the start gas and the plasma gas can be reduced by setting a longer time of 1.5 to 3 seconds for the time period in which the plasma arc current increases to a predetermined current value (for example 400 amperes) or by setting the flow rate of the start gas to a value which is lower than that of the plasma gas by 5 to 50 percent.

The plasma gas electromagnetic valve 3b is opened (plasma gas ON) after 0.4 second elapses from the plasma arc ON which is a point of the time when the energization for the electrode 1b is started. The plasma gas electromagnetic valve 3b is opened 0.1 second before the start gas electromagnetic valve 2b is closed. After the plasma gas electromagnetic valve 3b is opened, a flow rate of the plasma gas becomes stable at the previously set flow rate by being controlled by the flow rate maintaining member 4 as indicated by the solid line of "FLOW RATE" of the present embodiment.

As indicated by the solid line in the figure, the flow rate of the gas in the present embodiment increases after the plasma gas ON. This is affected by the rapid change in gas flow rate at the upstream side of the flow rate maintaining member 4 due to the change of the plasma gas electromagnetic valve 3b from OFF to ON. Namely, while the flow rate maintaining member 4 is responding to the gas flow rate change at the upstream side, the gas flow rate increases at the downstream side.

As indicated by the line of "PLASMA ARC CURRENT" in the figure, the current flowing through the electrode 1b increases to a previously set current (for example 400 amperes) after a rising time of several seconds elapses from the time when the energization is started by the plasma arc ON signal. In this process of the current increase, the start gas is switched to the plasma gas.

In the present embodiment, the flow rate of the start gas is set to 40 normal liters per minute (NL/min) and that of the plasma gas is also set to 40 normal liters per minute (NL/min). These previously set flow rates of the start gas and the plasma gas are stored in the data storage 10b of the controlling device 10 via the input device 11.

When a start signal of plasma cutting is generated by an operational switch (not shown), the start gas electromagnetic valve 2b is opened and at the same time, a control signal indicating the flow rate 40 NL/min of the start gas is output from the fluid controlling portion 10d to the flow rate maintaining member 4. Thus, the start gas is supplied to the gas chamber 1e formed in the torch 1 with the flow rate maintained at the previously set value.

While the start gas is being supplied to the gas chamber 1e, a plasma arc ON signal for the power source 6 is generated and electricity is discharged between the electrode 1b and the nozzle 1c thereby forming a pilot arc and a plasma arc in this order. The start gas is formed of gas which does not include oxygen or gas with an oxygen concentration lower than that of the plasma gas, thereby suppressing wear of the electrode.

At the time when 0.4 second elapses after the plasma arc On signal is generated, the plasma gas ON signal is generated for the plasma gas electromagnetic valve 3b, thereby supplying the plasma gas from the plasma gas piping 3c to the flow rate maintaining member 4. At the same time, a control signal indicating the flow rate of 40 (NL/min) of the plasma gas is output from the fluid controlling portion 10d to the flow rate maintaining member 4.

At this time, both the start gas and the plasma gas are simultaneously supplied to the flow rate maintaining member 4, thereby supplying gas with a flow rate larger than the instructed flow rate of 40 (NL/min). Thus, the flow rate maintaining member 4 detects that the flow rate is larger than the previously set value and controls the flow rate such that the flow rate is maintained at the previously set value.

When the 0.5 seconds elapses after the plasma arc ON signal is generated, the start gas OFF signal is generated for the start gas electromagnetic valve 2b and the start gas electromagnetic valve 2b is closed thereby the supply of start gas from the start gas piping 2c to the flow rate maintaining member 4 is stopped.

Thus, the plasma gas with a momentary large flow rate at the supply start and the start gas with a relatively gently decreasing flow rate are mixed and the mixed gas are supplied to the flow rate maintaining member 4. Even if the gas with the complex flow rate change is supplied to the flow rate maintaining member 4, the flow rate maintaining member 4 controls the flow rate of the plasma gas to a previously set value and it only takes about 0.2 second for the flow rate to become stable.

While the gas to be supplied to the gas chamber is being switched from the start gas to the plasma gas, a plasma arc is formed by being electrically discharged between the electrode 1b and the material B to be cut. After that, the start gas is completely stopped and only the plasma gas is supplied to the gas chamber 1e to continue to form the plasma arc.

Thus, the cutting of the material B to be cut can be performed in the above state.

As explained above, the present embodiment includes the plasma gas connection portion 8 at which the start gas piping 2c and the plasma gas piping 3c are connected and the flow rate maintaining member 4 provided at the gas piping portion 5 to which the torch 1 is connected. Thus, when a flow rate of the gas supplied from the upstream side of the flow rate maintaining member 4 changes, a stable flow rate can be maintained at the downstream side. Thus, the change in the flow rate of the gas in the gas chamber 1e can be suppressed, thereby extending service life of the electrode.

An experiment performed for comparing the plasma cutting apparatus A according to the present invention and our conventional apparatus shows that service life of the electrode is sufficiently extended in the present embodiment. Namely, in this experiment, the plasma cutting apparatus A (torch A) according to the present invention and the convention plasma cutting apparatus (torch S) are used and the ratio of service life of the electrode in the present invention with respect to service life of the electrode in the conventional apparatus is obtained by measuring service life (unit of minutes) in these apparatus while the current is changed from 130 A to 400 A. The result of this experiment is as follows.

In the current value range of 130 A to 260 A, the service life of the torch A is 1.5 to 2.5 times longer than that of the torch S. In the current value range of 260 A to 400 A, the service life of the torch A is 1.2 to 1.5 times longer than that of the torch S.

As explained above, it is clear that service life of the electrode in the plasma cutting apparatus A of the present invention is extended with respect to that of the conventional cutting apparatus S even when the cutting is performed with any current value.

INDUSTRIAL APPLICABILITY

The plasma cutting apparatus A according to the present invention can be advantageously used when a steel plate is cut.

EXPLANATION OF REFERENCES

A plasma cutting apparatus
B material to be cut
1 plasma cutting torch, torch
1a torch main body
1b electrode
1c nozzle
1d nozzle opening
1e gas chamber
2 start gas supplying portion
2a start gas supplying source
2b start gas electromagnetic valve
2c start gas piping
3 plasma gas supplying portion
3a plasma gas supplying source
3b plasma gas electromagnetic valve
3c plasma gas piping
4 flow rate maintaining member
5 gas piping portion
6 power source
7 cooling water supplying portion
8 plasma gas connection portion
10 controlling device
10a controlling portion
10b data storage
10c timer portion
10d fluid controlling portion
11 input device
12 input portion
13 output portion While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. A plasma cutting apparatus in which start gas is supplied in a circumference of an electrode provided on a plasma cutting torch before applying a plasma current to the electrode, and in which the start gas is switched to plasma gas in the process where a plasma arc is produced at a previously set current value after the plasma current is applied to the electrode, the plasma cutting apparatus comprising:
   a) a start gas supplying portion which supplies the start gas to the electrode, the start gas supplying portion having a start gas supplying source and a start gas electromagnetic valve provided on start gas piping;
   b) a plasma gas supplying portion which supplies the plasma gas to the electrode, the plasma gas supplying portion having a plasma gas supplying source and a plasma gas electromagnetic valve provided on plasma gas piping;
   c) a plasma gas connection portion which connects a downstream-side end of the start gas supplying portion and a downstream-side end of the plasma gas supplying portion such that the start gas supplied by the start gas supplying portion and the plasma gas supplied by the plasma gas supplying portion are able to be joined to each other;
   d) a gas piping portion which supplies the start gas, the plasma gas or gas in which the start gas and the plasma gas are mixed to the electrode, the gas piping portion having a flow rate maintaining member, one end of the gas piping portion being connected to the plasma gas connection portion such that the start gas and the plasma gas joined to each other at the plasma gas connection portion is able to flow into the gas piping portion and the other end of the gas piping portion being connected to the plasma cutting torch;

e) a controlling device which controls the flow rate maintaining member as well as opening and closing of the start gas electromagnetic valve and the plasma gas electromagnetic valve;

f) wherein when a flow rate of the start gas, the plasma gas, or the start gas and the plasma gas provided from the plasma gas connection portion is changed, the flow rate maintaining member maintains the changed flow rate at a previously set flow rate;

g) wherein the controlling device informs the flow rate maintaining member of a gas flow rate to be maintained at the gas piping portion and opens the start gas electromagnetic valve by sending a valve opening signal to the start gas electromagnetic valve before the plasma current is applied to the electrode provided on the plasma cutting torch; and h) wherein after the start gas electromagnetic valve is opened, the controlling device opens the plasma gas electromagnetic valve by sending a valve opening signal to the plasma gas electromagnetic valve in the process where the plasma arc is produced at the previously set current value after the plasma current is applied to the electrode, and thereafter the controlling device closes the start gas electromagnetic valve by sending a valve closing signal to the start gas electromagnetic valve before the plasma gas electromagnetic valve is closed by receiving a valve closing signal from the controlling device.

2. The plasma cutting apparatus according to claim 1, wherein:

a) the start gas is gas with an oxygen concentration lower than that of the plasma gas, or gas which does not include oxygen.

* * * * *